United States Patent [19]
Nordgren et al.

[11] 3,723,408
[45] Mar. 27, 1973

[54] HYDROXYALKYL POLYGALACTOMANNANS BY REACTION WITH CERTAIN HALO FATTY ACID COMPOUNDS

[75] Inventors: Robert Nordgren; Duane A. Jones; Harold A. Wittcoff, all of Minneapolis, Minn.

[73] Assignee: General Mills Chemicals, Inc.

[22] Filed: May 26, 1970

[21] Appl. No.: 40,744

[52] U.S. Cl............260/209 R, 99/144, 252/8.55 R, 252/316, 424/49, 424/70
[51] Int. Cl...............................................C07c 47/18
[58] Field of Search....................260/209 R, 234 R

[56] References Cited

UNITED STATES PATENTS

| | | |
|---|---|---|
| 2,477,544 | 7/1949 | Moe..................260/209 R |
| 2,523,708 | 9/1950 | Moe..................260/234 R |
| 2,602,789 | 7/1952 | Schwartz et al..........260/234 R |
| 3,326,890 | 6/1967 | Engelskirchen et al.......260/209 R |
| 3,350,386 | 10/1967 | Engelskirchen et al.......260/209 R |
| 3,415,927 | 12/1968 | Butensky et al.............260/209 R |
| 3,467,647 | 9/1969 | Benninga..................260/209 R |

*Primary Examiner*—Lewis Gotts
*Assistant Examiner*—Johnnie R. Brown
*Attorney*—Anthony A. Juettner and Gene O. Enockson

[57] ABSTRACT

The hydration rate of hydroxyalkyl polygalactomannans is improved by reaction with certain halo fatty acids or the alkali metal salts thereof. Such products find utility as thickeners for various fluids.

2 Claims, No Drawings

HYDROXYALKYL POLYGALACTOMANNANS BY REACTION WITH CERTAIN HALO FATTY ACID COMPOUNDS

This invention relates to a process for preparing hydroxyalkyl polygalactomannan derivatives having improved properties and to the resulting products. More particularly, it relates to such a process wherein halo fatty acids or the alkali metal salts thereof are used to increase the hydration rate of the hydroxyalkyl polygalactomannans.

Hydroxyalkyl ethers of polygalactomannans, and especially guar gum, have been made by the reaction of the polygalactomannans with an alkylene oxide which has at least 3 carbon atoms. The alkylene oxide having at least 3 carbon atoms reacts with hydroxyl groups present in the polygalactomannan. The resulting products have a degree of substitution (D.S.) of from about 0.05 to 5 and preferably about 0.1 to 4. In guar gum, for example, the basic unit of the polymer is comprised of two mannose units with a glycosidic linkage and a galactose unit attached to one of the hydroxyls of the mannose units. On the average, each of the sugar units has three available hydroxyl sites, all of which may react. In addition, a new hydroxyl group is added with each alkylene oxide group and it too can react. Theoretically, then, there is no limit to the amount of alkylene oxide that may be added to the polygalactomannan. As a practical matter, however, a degree of substitution of about 4 or 5 represents the practical upper limit. D.S. products of 0.05 to 5 are achieved by reacting the alkylene oxide with the polygalactomannan employing from about 0.1 to 6.0 oxirane equivalents from the alkylene oxide per anhydrohexose unit of the polygalactomannan.

The hydroxyalkyl ethers as above described are prepared from alkylene oxides having up to 8 carbon atoms. Generally, the oxirane group is a terminal vicinal epoxy group. Such alkylene oxides may be represented by the following formula:

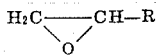

where R is an alkyl group having from one to six carbon atoms. R is preferably methyl, such as propylene oxide. R may also, however, be ethyl, propyl, butyl, amyl, hexyl and the like.

Basically, the hydroxyalkyl ethers are prepared by the reaction of the polygalactomannan with the alkylene oxide in the presence of an alkaline catalyst. Commercially available guar gum generally contains from about 8 to 15 percent moisture by weight. For convenience, the reaction will hereinbelow be described with reference to guar gum and propylene oxide to provide the hydroxypropyl ether or polyhydroxypropyl ether of guar gum. The rate of reaction is dependent on the catalyst concentration and the temperature. Temperatures substantially higher than room temperature will generally require pressure equipment or solvent reflux. Average reaction efficiency is in the range of 60 to 80 percent. The reaction may be illustrated in its simplest, idealized form by the following equation:

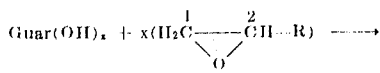

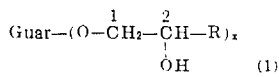

The final product may be more conveniently shown by the formula

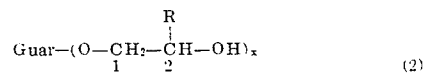

This latter formula more clearly illustrates the attachment of the R group to the same carbon atom as the hydroxyl group, the hydroxyl group being attached to a secondary carbon atom. With propylene oxide the R group is methyl. With other alkylene oxides having a terminal, vicinal epoxide group, the R group will be an alkyl group having two carbon atoms less than the alkylene group of the alkylene oxide. "Guar" in the formula represents guar minus $x$ number of hydroxyl groups capable of reacting with the alkylene oxide and $x$ is an integer from 1 to 3 for an anhydrohexose unit of guar.

Formula (2) above represents the idealized formula for such hydroxyalkyl ether species. As indicated above, each sugar unit contains 3 hydroxyl groups which may react with the alkylene oxide. In such a case, $x$ is an integer from 1 to 3 in any one sugar unit of the guar gum. Various degrees of substitution may be achieved, however. As also indicated above, it is possible to have a degree of substitution greater than 3, as the alkylene oxide may also react with the hydroxyl group attached to the secondary carbon atom of the alkyl group subsequent to the reaction of a molecule of alkylene oxide with one of the reactive hydroxyl groups of the polygalactomannan. In such event, the hydroxyalkyl ether product may be illustrated by the formula

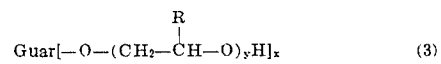

where $x$ is an integer up to 3 and $y$ is an integer dependent on the degree of substitution, which, as a practical matter, is rarely in excess of 3. It is difficult to specify the exact integers for $x$ and $y$ in any one specific product and, accordingly, the product is described by reference to the degree of substitution which indicates the amount of alkylene oxide reacted.

In view of their complex nature, it is difficult to define the described ethers by any simple chemical name. The products are most conveniently defined as a hydroxyalkyl ether of a polygalactomannan in which the alkyl group has three to eight carbon atoms and the hydroxyl group is attached to a secondary carbon atom. In this manner, both the idealized simple ethers and the complex products are encompassed. In the idealized formula (2) above, the product would be mono- or poly-2-hydroxy, 2-alkylethyl-guar ether in which the alkyl group has from one to six carbon atoms. The products may, of course, also be described by reference to the reactants.

Such hydroxyalkyl ethers of polygalactomannans have various uses. Thus they find use as thickening agents for various fluids, including oil well fracturing fluids. At a degree of substitution of 0.4 and above, they dissolve in water with extreme foaming. This property makes them useful as an air entrainer, a toothpaste bodying agent, a thickener for explosive slurries and a thickener for cream-type hair shampoos. Because of the presence of the alkyl group attached to the same carbon atom as the hydroxyl group, the products have lipophyllic properties and thus utility as an emulsifier-thickener for emulsions such as salad dressings. Products having a D.S. in the range of 0.5 to 1.2 provide progressively clearer solutions free from insolubles which are in contrast to unmodified guar, for example, which gives very cloudy solutions having appreciable insolubles.

In many of the above uses, it would be desirable to increase the hydration rate of the hydroxyalkyl polygalactomannans. We have now discovered that such increased rate of hydration can be obtained by also reacting the polygalactomannans with certain halo fatty acids or the alkali metal salts thereof.

The term "polygalactomannans" as used herein includes the general class of polysaccharides containing both galactose and mannose units. The polygalactomannans are usually found in the endosperm sections of leguminous seeds such as guar, locust bean, honey locust, flametree and Cassia occidentalis. The invention has particular value in providing improved derivatives of guar gum due to the ready availability of the same.

In accordance with the present invention, the hydroxyalkyl derivatives of polygalactomannans are modified by reaction with a halo fatty acid or alkali metal salt thereof. Suitable halo fatty acids include chloroacetic acid, chloropropionic acid, chlorobutyric acid and the like. The said halo fatty acids can have two to four carbon atoms in the fatty chain. It is preferred to use the sodium salts of the halo fatty acids and sodium chloroacetate is the particularly preferred reactant.

It is preferred to include the halo fatty acid reactant as described during the reaction of the polygalactomannan with the described alkylene oxides. The reaction may be conducted at room temperature or elevated temperatures. At room temperature, the reaction is slower. A general temperature range would be from about 17°C. to about 100°C. While higher temperatures might sometimes be used, such as up to 125°C., there is generally no advantage thereto and higher temperatures may have an adverse effect on color of the product. Where temperatures other than room temperature are employed, temperatures on the order of about 50–100°C. are generally used.

The reaction is carried out using an alkaline catalyst. Such catalysts are in general the alkali metal or alkaline earth metal hydroxides, such as sodium, potassium or calcium hydroxide. Ammonia may also be used. No special advantage, however, is obtained by the use of more exotic basic or alkaline catalysts over the use of NaOH which is the most commonly available alkaline catalyst. In general, however, it is only necessary that an alkaline catalyst be present, and the process is not restricted to the use of any specific catalyst, although NaOH is preferred.

Only small amounts of the catalyst need be employed. Thus it is generally not necessary to exceed 10 percent by weight of the polygalactomannan, although larger amounts might be used. A preferred range is 0.1 to 5 percent by weight of the polygalactomannan.

The reaction may be conducted at atmospheric pressure, under reflux or at elevated pressures in a closed reactor. The exact pressure is not critical and the reaction is preferably carried out under reflux conditions. The time of reaction is generally dependent on the temperature, amount of reactants and the degree of substitution desired. At room temperature long periods of time are required, particularly where high degrees of substitution are desired. At higher temperatures, under reflux or under pressure, shorter time periods are employed. Under the slowest conditions, times up to 100 hours may be required. Generally, at least about three hours are required, although under certain conditions and low degrees of substitution, shorter time periods may be employed. At lower levels of substitutiion at elevated temperatures, time periods of from 5 to 15 hours are commonly employed.

The reaction may be conducted in the substantial absence of water or solvent (no water added) although the efficiency of reaction is very low without the addition of water. Accordingly, the reaction is generally conducted in the presence of water to provide higher reaction efficiency. In the absence of other solvents, catalytic amounts of water on the order of about 3 to 8 percent based on the polygalactomannan are preferably employed, these small amounts generally being employed where higher temperatures are used. Where lower temperatures and atmospheric pressure are used, generally larger amounts of water will be employed. Further, it is preferred to utilize organic solvents, either water-miscible or water-immiscible. Illustrative of such organic solvents are isopropanol (water-miscible) and heptane (water-immiscible). Other unreactive organic solvents may be employed although the two mentioned are preferred. Such other organic solvents are the common aliphatic hydrocarbons having from 5 to 10 carbon atoms which are commercially available, such as heptane and hexane. Alkanols higher than methanol, those having from 2 to 6 carbon atoms, may also be employed, such as t-butanol. When employed with a solvent, such as isopropanol or heptane, from 10 to 80 percent water based on the weight of the polygalactomannan is preferably used with from 30 to 70 percent being most desirable with the water-miscible solvents and 20–30 percent being most desirable with the water-immiscible solvents.

Where organic solvents are used, they are preferably employed in an amount up to about eight times the weight of the polygalactomannan. Preferably, with the water-miscible solvents, an amount of from about 1 to 3 times the weight of the polygalactomannan is used. With water-immiscible solvents, an amount of from about three to five times the weight of the polygalactomannan is preferably employed.

The halo fatty acid reactant is used in an amount sufficient to increase the hydration rate of the hydroxyalkyl polygalactomannans. Preferably, the said reactant will be used in an amount of about 0.5 to 5.0 percent by weight based on the weight of the polygalactomannan. Amounts below this range and in the lower part of the range improve hydration rates moderately while amounts of the halo fatty acid reactant above about 5.0 percent give no additional advantages and for cost reasons are, therefore, not preferred.

Since alkali degradation may cause a reduction in the products viscosity producing character, it is optional but desirable to add a small amount of sodium borohydride to the reaction mixture. It is known that sodium borohydride will reduce carbonyl groups on polysaccharides. And it is believed that these carbonyl groups are sites for any alkali degradation of the polygalactomannan gum. The sodium borohydride is thus optionally added in an amount of 0.01 to 0.10 percent by weight based on the weight of the polygalactomannan.

At the completion of the reaction, it is preferred to neutralize the reaction mixture by the addition of an acid such as acetic, hydrochloric, sulfuric, nitric, and the like. Additionally, the product may be filtered and dried.

The following examples illustrate certain preferred embodiments of the invention without being limiting. The examples also include comparative products prepared without modification with the halo fatty acid reactant.

EXAMPLE I

Into a one liter 3-necked reaction flask fitted with a thermometer, stirrer and condenser were charged the following: 100 g. guar flour, 150 ml. isopropanol, 70 ml. water containing 3 g. sodium hydroxide, 29 g. propylene oxide and 2.9 g. sodium chloroacetate. This reaction mixture was refluxed for 5 ½ hours during which period the temperature rose from 43° to 77° C. The reaction product was neutralized with 5.5 ml. glacial acetic acid, filtered, washed on the filter with isopropanol and finally dried. The yield was 116 g.

EXAMPLES III AND V–IX AND COMPARATIVE EXAMPLES II AND IV

Example I was essentially repeated with varying amounts of sodium chloroacetate and/or with the addition of sodium borohydride in Examples III and V–IX. Example I was essentially repeated without using sodium chloroacetate (Example II) and without sodium chloroacetate but with sodium borohydride (Example IV). The products of all the Examples were then subjected to various tests with the data being set forth in the following Table:

TABLE

| Example | Wt. percent sodium chloroacetate | Wt. percent NaBH$_4$ | 1%[1] viscosity | Hydration rates[2] after- | | | | Percent[3] filtered |
|---|---|---|---|---|---|---|---|---|
| | | | | 1 min. | 2 min. | 5 min | 60 min. | |
| I | 2.9 | | 2,350 | 27.8 | 44.4 | 51.0 | 51.0 | 98 |
| II | | | 2,300 | 18.0 | 28.8 | 43.2 | 52.2 | 96 |
| III | .5 | .04 | 3,500 | 24.0 | 37.8 | 51.0 | 54.6 | 92 |
| IV | | .04 | 3,400 | 14.4 | 36.5 | 51.0 | 54.6 | 95 |
| V | 1.0 | .04 | 3,050 | 32.4 | 43.8 | 54.0 | 55.2 | 91 |
| VI | 2.0 | .04 | 3,250 | 26.0 | 45.0 | 53.4 | 55.2 | 87 |
| VII | 2.9 | .04 | 2,650 | 45.6 | 52.2 | 55.2 | 52.8 | 93 |
| VIII | 4.0 | .04 | 2,650 | 50.4 | 54.4 | 57.6 | 57.6 | 87 |
| IX | 5.0 | .04 | 2,750 | 51.0 | 54.6 | 58.2 | 57.0 | 55 |

[1] One percent aqueous solutions were prepared and allowed to stand in a water bath overnight at 25° C. The values are centipoises as measured with a Brookfield viscometer at 20 r.p.m.

[2] Hydration rates were measured by the following procedure: 2.4 g. dried product was added at once to 500 g. distilled water (80° F.) that was stirred rapidly in a Waring blendor (The Variac was set between 30 and 35 volts and the blendor turned on the high speed setting) After 10 seconds in the Blendor, the sol was poured into a 600 ml. beaker and the viscosity measured with a Model 35 Fann viscometer at 100 r.p.m. Measurements were made at 1, 2 and 5 minutes after which the solution was placed in an 80° F. water bath for 55 minutes and the viscosity again measured. Since the reading at 60 minutes represents substantially complete viscosity development, the rapidity of the hydration can be determined from such reading and the readings at 1, 2 and 5 minutes.

[3] Four hundred grams of the hydration rate solutions of (2) were filtered through a 9 cm No. 50 Whatman filter paper in a pressure filter operated at 100 p.s.i. The percent filtered is the amount of clear filtrate obtained up to the time the filtrate slows to a drip. Values above 85% are most desired.

The above data show that the halo fatty acid reactant appreciably increases the hydration rate of the hydroxyalkyl polygalactomannans and that between about 2.9 and 4.0 percent is optimum. The data also show that sodium borohydride tends to prevent loss of viscosity in the improved products.

We claim:

1. A hydroxyalkyl ether of a polygalactomannan prepared by reacting a polygalactomannan with (1) an alkylene oxide of three to eight carbon atoms and (2) a chloro fatty acid reactant selected from chloro fatty acids of two to four carbon atoms and the alkali metal salts thereof, said chloro fatty acid reactant being used in an amount of about 0.5 to 5.0 percent by weight based on the weight of the polygalactomannan and the reactions of the alkylene oxide and the chloro fatty acid reactant with the polygalactomannan being carried out in the presence of an alkaline catalyst.

2. The product of claim 1 wherein the polygalactomannan is guar gum, the alkylene oxide is propylene oxide, the alkaline catalyst is sodium hydroxide and the chloro fatty acid reactant is sodium chloroacetate

* * * * *